(12) United States Patent
Parthasarathy et al.

(10) Patent No.: US 6,233,555 B1
(45) Date of Patent: May 15, 2001

(54) METHOD AND APPARATUS FOR SPEAKER IDENTIFICATION USING MIXTURE DISCRIMINANT ANALYSIS TO DEVELOP SPEAKER MODELS

(75) Inventors: Sarangarajan Parthasarathy, New Providence; Aaron E. Rosenberg, Berkeley Heights, both of NJ (US)

(73) Assignee: AT&T Corporation, New York, NY (US)

( * ) Notice: Subject to any disclaimer, the term of this patent is extended or adjusted under 35 U.S.C. 154(b) by 0 days.

(21) Appl. No.: 09/198,579

(22) Filed: Nov. 24, 1998

Related U.S. Application Data

(60) Provisional application No. 60/066,280, filed on Nov. 25, 1997.

(51) Int. Cl.[7] .................................................. G10L 17/00
(52) U.S. Cl. ............................................. 704/249; 704/240
(58) Field of Search .................................... 704/246–250, 704/273; 379/88.02

(56) References Cited

U.S. PATENT DOCUMENTS

| | | | |
|---|---|---|---|
| 5,054,083 | * 10/1991 | Naik et al. | 704/272 |
| 5,615,299 | * 3/1997 | Bahl et al. | 704/254 |
| 5,687,287 | * 11/1997 | Gandhi et al. | 704/247 |
| 5,754,681 | * 5/1998 | Watanabe et al. | 382/159 |
| 5,839,103 | * 11/1998 | Mammone et al. | 704/232 |
| 5,913,192 | * 6/1999 | Parthasarathy et al. | 704/256 |
| 5,995,927 | * 11/1999 | Li | 704/246 |
| 6,029,124 | * 2/2000 | Gillick et al. | 704/200 |

OTHER PUBLICATIONS

Joseph T. Buck, David K. Burton, and John E. Shore, "Text–Dependent Speaker Recognition Using Vector Quantization," Proc. IEEE Int. Conf. Acoust. Speech, and Sig. Proc. ICASSP 85, Mar. 26–29, 1985, pp. 391–394.*

(List continued on next page.)

Primary Examiner—David Hudspeth
Assistant Examiner—Donald L. Storm
(74) Attorney, Agent, or Firm—Oliff & Berridge, PLC

(57) ABSTRACT

A speaker identification system is provided that constructs speaker models using a discriminant analysis technique where the data in each class is modeled by Gaussian mixtures. The speaker identification method and apparatus determines the identity of a speaker, as one of a small group, based on a sentence-length password utterance. A speaker's utterance is received and a sequence of a first set of feature vectors are computed based on the received utterance. The first set of feature vectors are then transformed into a second set of feature vectors using transformations specific to a particular segmentation unit, and likelihood scores of the second set of feature vectors are computed using speaker models trained using mixture discriminant analysis. The likelihood scores are then combined to determine an utterance score and the speaker's identity is validated based on the utterance score. The speaker identification method and apparatus also includes training and enrollment phases. In the enrollment phase the speaker's password utterance is received multiple times. A transcription of the password utterance as a sequence of phones is obtained, and the phone string is stored in a database containing phone strings of other speakers in the group. In the training phase, the first set of feature vectors are extracted from each password utterance and the phone boundaries for each phone in the password transcription are obtained using a speaker independent phone recognizer. A mixture model is developed for each phone of a given speaker's password. Then, using the feature vectors from the password utterances of all of the speakers in the group, transformation parameters and transformed models are generated for each phone and speaker, using mixture discriminant analysis.

18 Claims, 7 Drawing Sheets

OTHER PUBLICATIONS

A. E. Rosenberg, C.–H. Lee, and F. K. Soong, "Sub–Word Unit Talker Verification using Hidden Markov Models," Proc. 1990 Int. Conf. Acoust. Speech, and Sig. Proc. ICASSP 90, Apr. 3–6, 1990, pp. 269–272.*

M. Sharma and R, Mammone, "Subword–based Text–dependent speaker Verification System with User–selectable Passwords," Proc. 1996 IEEE Int. Conf. Acoust. Speech, and Sig. Proc. ICASSP 96, May 7–10, 1996, pp. 93–96.*

K. Fukunaga, *Introduction to Statistical Pattern Recognition,* Chapter 10, "Non Linear Mapping", pp. 288–322, Academic Press, Inc. 1990.

L. Breiman and R. Ihaka, "Nonlinear Discriminant Analysis Via Scaling and ACE," Technical Report, University of California, Berkeley, 1984.

T. Hastie, R. Tibshirani and Buja, "Flexible Discriminant Analysis by Optimal Scoring," *Journal of the American Statistical Association,* 89, pp. 1255–1270, 1994.

T. Hastie and R. Tibshirani, "Discriminant Analysis by Gaussian Mixtures," *Journal of the Royal Statistical Society (Series B),* 58, pp. 155–176, 1996.

D.X. Sun, "Feature Dimension Reduction Using Reduced–Rank Maximum Liklihood Extimation For Hidden Markov Models," Proc. Int. Conference on Spoken Language Processing, pp. 244–247, 1996.

A. E. Rosenberg, O. Siohan, and Parthasarathy, "Small Group Speaker Identification with Common Password Phrases," submitted to RLA2C, 1998.

* cited by examiner

METHOD AND APPARATUS FOR SPEAKER IDENTIFICATION USING MIXTURE DISCRIMINANT ANALYSIS TO DEVELOP SPEAKER MODELS

This non-provisional application claims the benefit of U.S. Provisional Application Ser. No. 60/066,280, filed Nov. 25, 1997, the subject matter of which is incorporated herein by reference.

BACKGROUND OF THE INVENTION

1. Field of Invention

This invention relates to determining the identity of a speaker as one of a small group, based on a sentence-length password utterance.

2. Description of Related Art

Security systems have long used passwords as a means to limit access to a single individual or groups of individuals. Passwords are common place for computer systems, building entry, etc., so that valuable information or materials may be protected.

Most secure systems requiring a password for entry require the user to enter alphanumeric text via a keyboard or keypad. However, with the advent of high quality speech recognition systems, there is a need for an accurate and reliable speaker identification system to allow entry to computer systems or buildings etc., using spoken passwords.

SUMMARY OF THE INVENTION

A speaker identification system is provided that constructs speaker models using a discriminant analysis technique where the data in each class is modeled by Gaussian mixtures. The speaker identification method and apparatus determines the identity of a speaker, as one of a small group, based on a sentence-length password utterance.

A speaker's utterance is received and a sequence of a first set of feature vectors are computed based on the received utterance. The first set of feature vectors are then transformed into a second set of feature vectors using transformations specific to a particular segmentation unit and likelihood scores of the second set of feature vectors are computed using speaker models trained using mixture discriminant analysis. The likelihood scores are then combined to determine an utterance score and the speaker's identity is validated based on the utterance score.

The speaker identification method and apparatus also includes training and enrollment phases. In the enrollment phase the speaker's password utterance is received multiple times. A transcription of the password utterance as a sequence of phones is obtained; and the phone string is stored in a database containing phone strings of other speakers in the group.

In the training phase, the first set of feature vectors are extracted from each password utterance and the phone boundaries for each phone in the password transcription are obtained using a speaker independent phone recognizer. A mixture model is developed for each phone of a given speaker's password. Then, using the feature vectors from the password utterances of all of the speakers in the group, transformation parameters and transformed models are generated for each phone and speaker, using mixture discriminant analysis.

These and other features and advantages of this invention are described in or are apparent from the following detailed description of the preferred embodiments.

BRIEF DESCRIPTION OF THE DRAWINGS

The invention is described with detail of references of the following drawings, wherein like numerals represent like elements, and wherein.

DETAILED DESCRIPTION OF PREFERRED EMBODIMENTS

Figure 1:
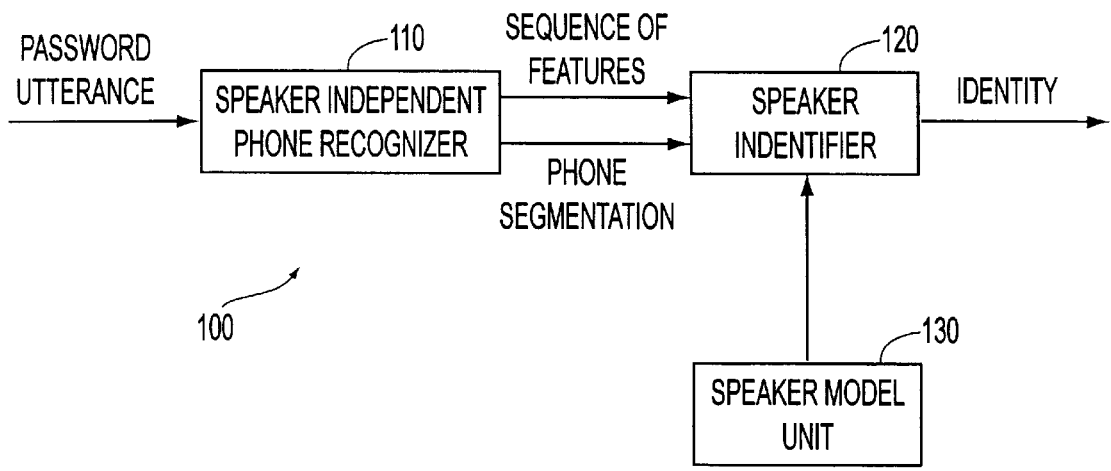
FIG. 1 is a block diagram of the speaker identification system.

FIG. 1 is a block diagram of an exemplary speaker identification system 100. The speaker identification system 100 includes a speaker independent phone recognizer 110, a speaker identifier 120 and speaker model unit 130. However, it can appreciated that this invention may be performed on any currently existing or later developed speaker identification system. Furthermore, the speaker independent phone recognizer 110 represents any currently existing or future speech recognition device.

Moreover, while the exemplary embodiment of the invention is described below using phones as the primary language segmentation unit, it may be appreciated that the invention may include the use of other language segmentation units, such as syllables or acoustic sub-units, for example.

When a user seeks access to a system or structure secured by a password, the user utters the password and it is input to the speaker independent phone recognizer 110. The password may be one word or a sentence, for example. The speaker independent phone recognizer 110 extracts features from the utterance and segments the utterance into a sequence of phones which are then input into the speaker identifier 120. The speaker identifier 120 compares the sequence of features and the phone segments generated from the password utterance by the speaker independent phone recognizer 110 with previously trained speaker models for each member of the group, from the speaker model unit 130, to generate a list of utterance scores. The speaker identifier 120 determines the identity as the speaker whose model produces the highest score. The best score is compared to a threshold to determine whether the password utterance is accepted or rejected.

The speaker identification process of the invention has essentially three phases: enrollment, training and identification. The enrollment phase is illustrated in the block diagram in FIGS. 2 and 3 and the flowchart in FIG. 10; the training phase is illustrated in the block diagrams in FIGS. 4–6 and the flowchart in FIG. 11; and the identification phase is illustrated in the block diagrams in FIGS. 7–9 and the flowchart in FIG. 12.

Figure 2:
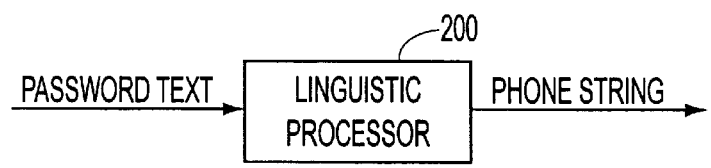
FIG. 2 is a block diagram of the enrollment stage using password text.

FIG. 2 is a block diagram of the enrollment phase of the speaker identification process when the password input is assumed to be known text. The password text is input to linguistic processor 200 which generates a phone transcription based on the password text input (For example, if the word "cat" is input, the linguistic processor 200 would break down the word cat into the phone string /k//ae//t/.) The phone transcription of the password is obtained by a dictionary lookup or rule-based text-to-phoneme conversion. To complete the enrollment, the user will have to speak the password a few times.

Figure 3:
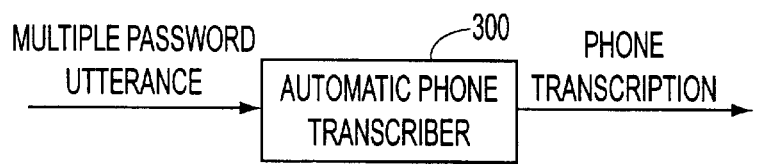
FIG. 3 is a block diagram of the enrollment stage using a password utterance.

FIG. 3 is a block diagram illustrating the enrollment phase of the speaker identification process using a password utterance input where the password is not known. In this phase, the speaker utters the password which is then input to the automatic phone transcriber 300. The automatic phone transcriber 300 generates a phone string such as that above, namely in the "cat" example, /k//ae//t/). The phone string generated will not necessarily correspond to a "dictionary" pronunciation if the text of the password is not provided. A password dictionary is created that stores the phone transcription for each user's password.

Figure 4:
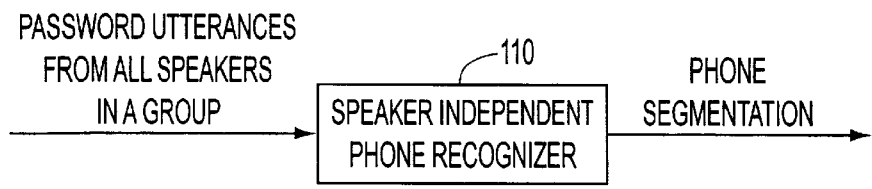
FIG. 4 is a block diagram illustrating the phone segmentation portion of the training phase.
Figure 5:
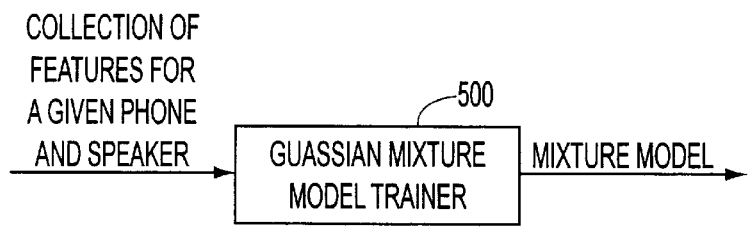
FIG. 5 is a block diagram illustrating the mixture model development portion of the training phase.
Figure 6:
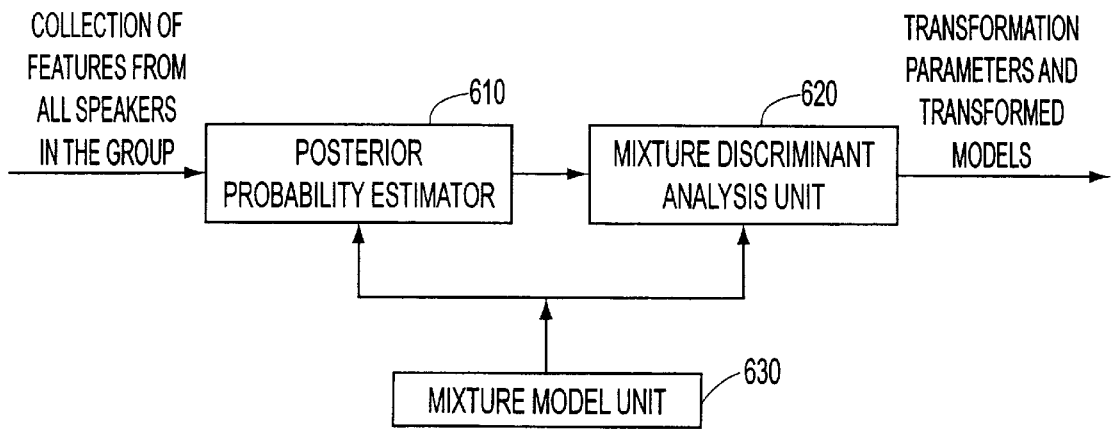
FIG. 6 is a block diagram illustrating the creation of transformation parameters and transformed models in the training phase.

FIGS. 4–6 illustrate the training phase of the speaker identification system 100. In the training phase, for example, N classifiers, 1 for each phone of the N phones in the password transcription, may be trained for a given group.

FIG. 4 illustrates the beginning of the training phase described above. Password utterances from all speakers in the group are input into a speaker independent phone recognizer 110. The speaker independent phone recognizer 110 segments the input string into individual phones, namely in the case of "cat", the individual phones are /k//ae//t/).

FIG. 5 is a block diagram illustrating the generation of mixture models. The Gaussian mixture model trainer 500 generates Gaussian mixture models from a collection of features for a given unit or phone and speaker. The Gaussian mixture model trainer 500 uses a K-means clustering algorithm to cluster the collection of features and initialize a Gaussian mixture model for the given phone and speaker. The means, covariances, and mixture weights of the initial model are updated using several (10, for example) iterations of a standard Expectation-Maximization algorithm. This process is repeated for each phone in the password transcription of every speaker. The result is set of mixture models, $\Lambda_j^p$ for the j-th speaker and p-th phone.

FIG. 6 is a block diagram illustrating the training of the transformation parameters and the transformed model. The collection of features from a segment labelled by a given phone from all speakers in the group is input to the posterior probability estimator 610. The probability density function of the i-th D-dimensional feature vector $x_i$ from a given phone and speaker j is modelled by:

$$P(x_i | \Lambda_j^p) = |2\pi\Sigma^p|^{-1/2} \sum_{m=1}^{M_j^p} c_{jm}^p e^{-D(x_1, \mu_{jm}^p)/2} \qquad (1)$$

where $\Sigma^p$ is the covariance common to all the speakers, $c_{jm}^p$ and, $\mu_{jm}^p$ are the mixture weights and the class means respectively, and $D(x, \mu)=(x-\mu)^T\Sigma^{-1}(x-\Sigma\mu)$. The process described here is repeated for each phone in the password transcription. The estimated posterior mixture probability of the l-th mixture of the j-th speaker model is:

$$\tilde{p}(g_{jl} | x; \Lambda_j^p) = \frac{c_{jl}^p e^{-D(x_i, \mu_{jl}^p)/2}}{\sum_{m=1}^{M_j^p} c_{jm}^p e^{-D(x, \mu_{jm}^p)/2}} \qquad l = 1, 2, \ldots, M_j^p \qquad (2)$$

The posterior probability estimator 610 computes the above probability for every mixture in each speaker model. These probabilities are input to the mixture discriminant analysis unit 620. The mixture discriminant analysis unit 620 also receives input from the mixture model unit 630 and outputs transformation parameters. These parameters are computed in the steps 0–4 as shown below:

0. Let $$M^p = \sum_{j=1}^J M_j^p$$

be the total number of mixtures over all speakers for phone p, where J is the number of speakers in the group. If there are $N^p$ feature vectors segmented into phone p taken from all of the speakers in the group, compute an $N^p \times M^p$ matrix $H^p$ as follows. The i-th row of $H^p$ has $M^p$ entries:

$$h^{(i)p} = \left[ h_1^{1p} \ldots h_{M_1}^{1p} h_1^{2p} \ldots h_{M_2^p}^{2p} \ldots h_1^{Jp} \ldots h_{M_j^p}^{Jp} \right]$$

If the i-th observation belongs to the utterance of speaker j then $h_l^{jp}=\hat{p}(g_{jl}|x_i; \Lambda_j^p)$ for l={1,2, ..., $M_j^p$}, and all other entries in the row are 0. $\hat{p}(g_{jl}|x_i; \Lambda_j^p)$ refers to the posterior probabilities in equation 2 estimated from training data.

1. Regression: Solve the equation $H^p=H^p B^p$ for $B^p$ to minimize the mean square error:

$$\varepsilon(\Theta^p, B^p) = \frac{1}{N^p} \sum_{k=1}^{K^p} \|H^p\theta_k^p - X^p b_k^p\|^2, \qquad (3)$$

where $X^p$ is a $N^p \times D$ data matrix whose rows are the feature vectors, $x_i$, $B^p$ is a $D \times K^p$ matrix whose columns are the regressors $b_k^p$, and $\Theta^p$ is a $J^p \times K^p$ matrix of score vectors $\theta_k^p$. Let the solution be $\tilde{B}^p$.

2. Optimal scoring: Obtain the score matrix $\Theta^p$ by setting it equal to the eigenvector matrix obtained in the eigen-decomposition of $H^{pT} \hat{H}^p$, with the normalization $\Theta^{pT} H^{pT} H^p\Theta^p=I$ where I is the identity matrix and $\hat{H}^p=X^p\tilde{B}^p$ is the estimated value of the $H^p$ matrix from step 1.

3. Update the regression coefficient matrix $\tilde{B}^p$ obtained in step 1 using optimal scores: $\hat{B}^p=\tilde{B}^p\Theta^p$. The projected observations of dimension $K^p$ is $\eta_{K^p}(x)=\hat{B}^{K^p}{}_T x$ where $\hat{B}^{K^p}{}_p$ is the $D\times K^p$ sub-matrix of $\hat{B}^p$ that retains the first $K^p$ columns.

4. Update $\hat{p}(g_{ji}|x_i; \Theta_j^p)$ and $c^{ji}{}_p$ using the standard Expectation-Maximization algorithm for Gaussian mixtures.

In this implementation example, two iterations of steps 1 through 4 are performed.

Figure 7:
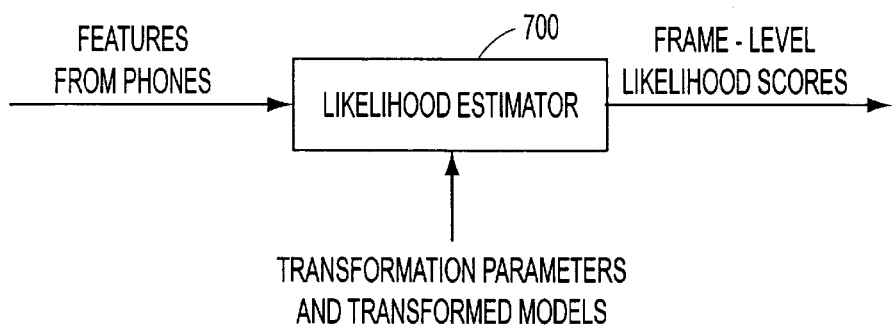
FIG. 7 is a block diagram illustrating the input portion of the identification phase.
Figure 8:
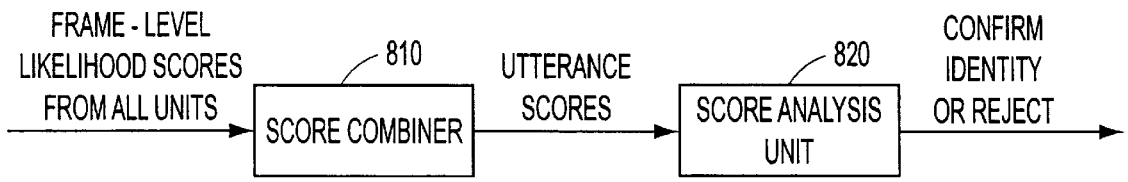
FIG. 8 is a block diagram illustrating the scoring portion of the identification phase.
Figure 9:
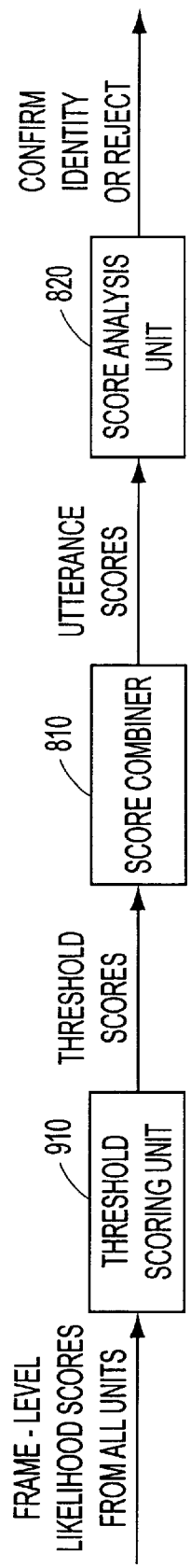
FIG. 9 is a block diagram illustrating the scoring portion of the identification phase using a threshold.

FIGS. 7–9 illustrate the identification phase of the speaker identification system 100. In the identification phase, classification is performed by computing utterance scores for each speaker in the group. FIG. 7 is a block diagram illustrating the first stage of the identification phase. Feature vectors belonging to a phone segment whose label is p extracted from the password utterance are input to a likelihood estimator 700. The likelihood estimator produces the log-likelihood of the $K^p$-dimensional projection of the feature vectors, where the value of $K^p$ is less than the original feature dimension D (i.e. a low-dimensional discriminant subspace), using thee transformation parameters and transformed models generated by the mixture discriminant analysis unit 620 during the training phase. The likelihood score, or frame-level likelihood score for speaker j is given by:

$$L(\eta_{K^p}(x_i) | \Lambda_j^p) = -\frac{1}{2}\log|2\pi\Sigma^p| + \sum_{m=1}^{M_j^p} \hat{c}_{jm}^p e^{-D(x,\hat{p}_{jm}^p)/2} \quad (4)$$

where $$D_k^p(x, \hat{\mu}_j) = \|E^p(\eta_{K^p}(x) - \hat{\mu}_j^p)\|^2 \quad (5)$$

where $\eta_{K^p}(x)$ is computed as explained in step 3 of the training stage and $E^p$ is a $K^p \times K^p$ diagonal matrix with:

$$E_{k,k}^{p^2} = \frac{1}{e_k^{p^2}\left(1 - e_k^{p^2}\right)} \quad (6)$$

and $e_k^{p2}$ is the mean square residual of the $k^{th}$ optimally scored fit, that is the $k^{th}$ term in the summation in equation 3.

FIG. 8 is a block diagram illustrating the identification/rejection phase of the identification process. The frame-level likelihood scores generated from FIG. 7 are input into a score combiner 810. The score combiner 810 generates the utterance score:

$$e_j^t = \frac{1}{N}\sum_{p=1}^{P}\sum_{i=1}^{N^p} L(\eta_{K^p}(x_i) | \Lambda_j^p) \quad (7)$$

where P is the number of phones in the utterance, $N^p$ is the number of observations in phone p, and $$N = \sum_{p=1}^{P} N^p$$

is the total number of feature vectors, for each speaker in the group. The utterance scores are then input to the score analysis unit 820 which either confirms that the password utterance belongs to one of the speakers in the group or rejects it as being uttered by an impostor, for example. The score analysis unit performs this task by comparing the utterance score to a threshold that has been established during the training process. This threshold is speaker specific and is adapted on input utterances.

FIG. 9 is a block diagram illustrating the confirmation and rejection processes of FIG. 8 but including a threshold scoring unit 910. The threshold scoring unit 910 takes the frame-level likelihood scores generated in FIG. 7 and outputs thresholded scores to be combined by the score combiner 810. The threshold scoring unit 910 assigns a speaker label $\hat{k}_i=j$ to each feature vector $x_i$, such that the frame-level likelihood score of the feature vector using the model for speaker j is the maximum of all the speaker frame-level likelihood scores. The score combiner then computes the overall utterance score as:

$$e_j^d = \frac{1}{N}\sum_{i=1}^{N} 1_j(\hat{k}_i) \quad (8)$$

where $1_j(\hat{k}_i)=1$ if $\hat{k}_i=j$ and 0 otherwise.

Figure 10:
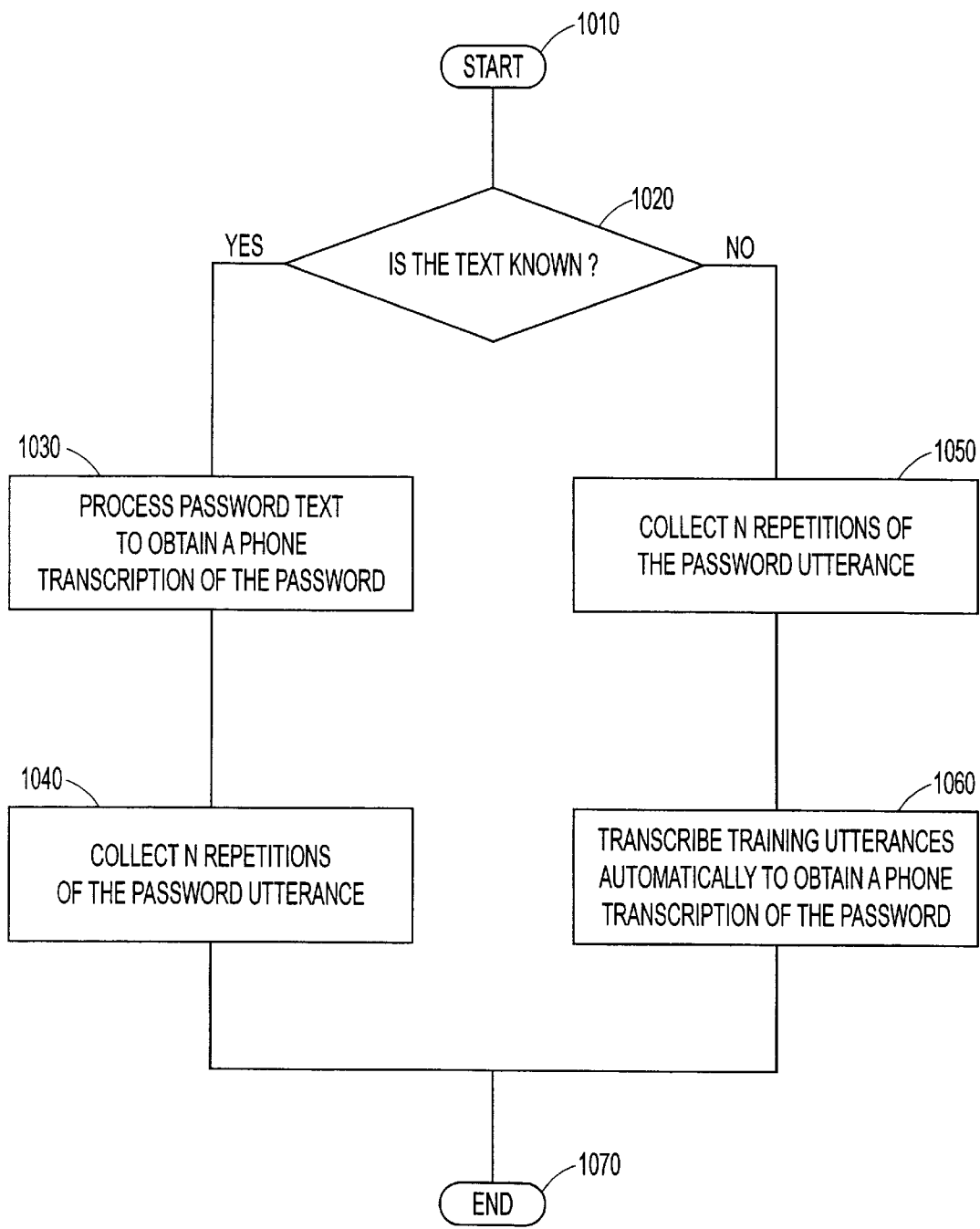
FIG. 10 is a flowchart of the enrollment phase of the invention.

FIG. 10 is a flowchart illustrating the enrollment phase. The process starts at step 1010 and proceeds to step 1020 where a determination is made as to whether the text of the password utterance is known or unknown. If the text is known, the process goes to step 1030 where the linguistic processor 200 processes the password utterance and produces a phone transcription of the password text. The process then proceeds to step 1040, where the linguistic processor 200 collects N repetitions of the transcribed password utterance from the speaker to generate training utterances used to train the speaker models. The phone transcriptions are then stored in a password dictionary. The process then goes to step 1070 and ends.

However, if the text is unknown, the process goes to step 1050 where the automatic phone transcriber 300 collects N repetitions of the password utterance from the speaker to generate tracing utterances used to train the speaker models. In step 1060, the automatic phone transcriber 300 processes the password utterance and produces a phone transcription of the password text. The phone transcriptions are then stored in a password dictionary. The process then goes to step 1070 and ends.

Figure 11:
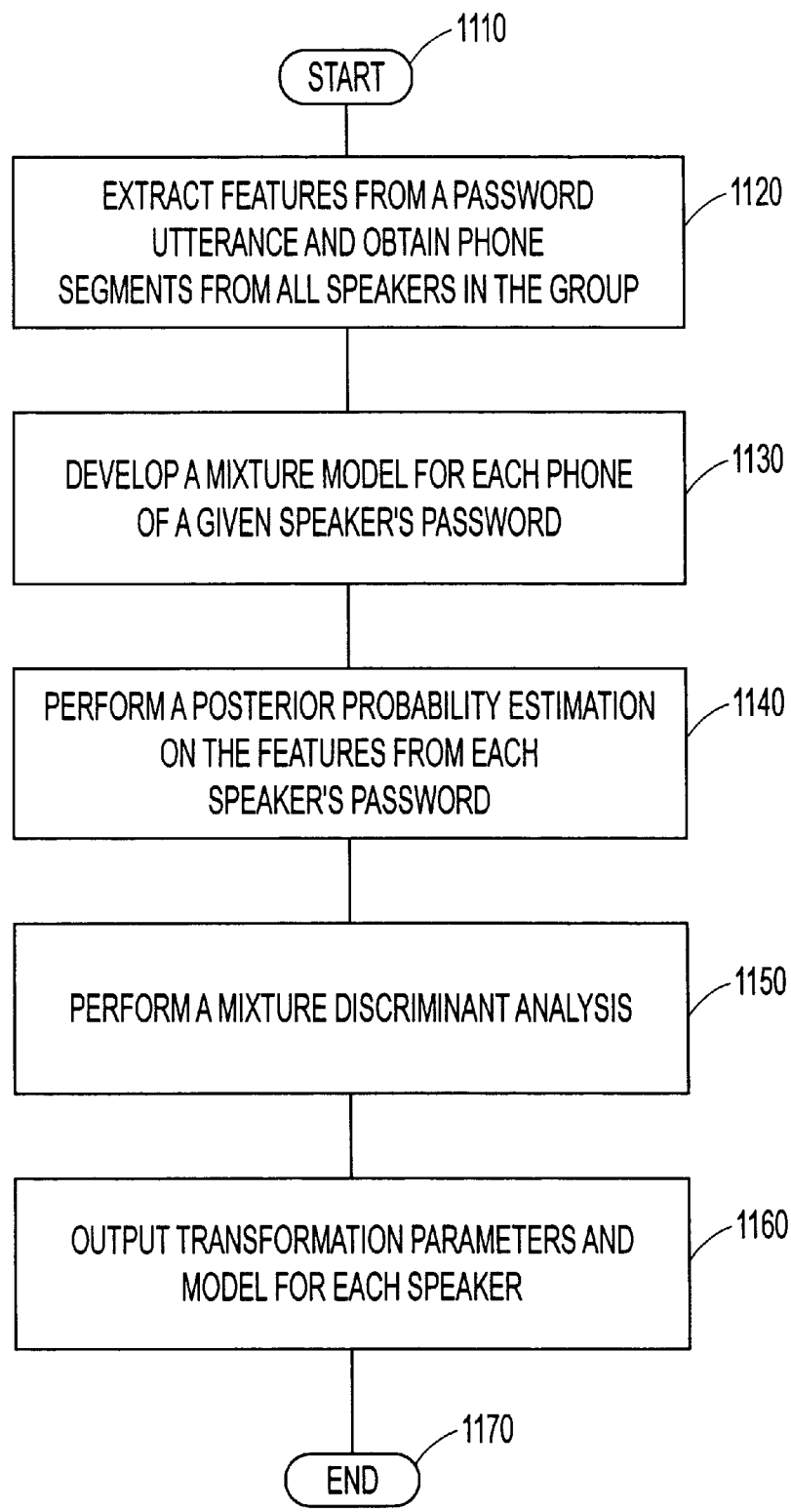
FIG. 11 is a flowchart of the training phase of the invention.

FIG. 11 is a flowchart of the training phase of the speaker identification process. The process begins in step 1110 and proceeds to step 1120 where the speaker independent phone recognizer 110 obtains password utterances from all speakers in the group and segments the utterances into phones. In step 1130 the Gaussian mixture model trainer 500 receives a collection of features for a given phone and speaker and outputs a mixture model.

In step 1140, the posterior probability estimator receives the collection of features and mixture models to output a posterior probability of a given vector. In step 1150, the mixture discriminant analysis unit 620 receives the posterior probabilities and mixture models and performs a mixture discriminant analysis.

The mixture discriminant analysis unit 620 then outputs transformed parameters and models for each speaker in step 1160, and the process goes to step 1170 and ends.

Figure 12:
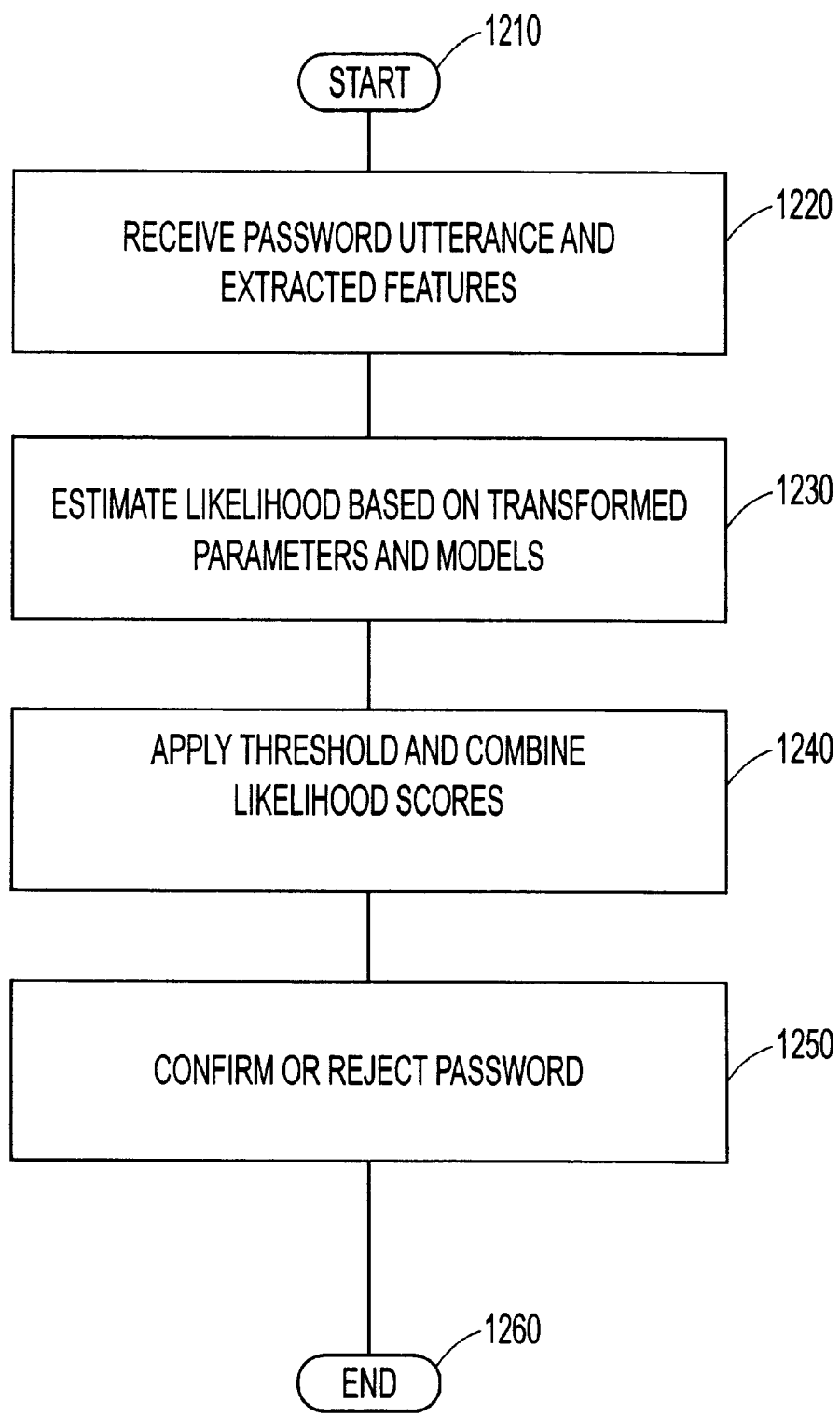
FIG. 12 is a flowchart of the identification phase of the invention.

FIG. 12 is a block diagram of the identification phase of the speaker identification process. Process begins at step 1210 and proceeds to step 1220 where a likelihood estimator receives a password utterance and its extracted features. In step 1230 the likelihood estimator 700 develops frame-level likelihood scores from the features and the transformation parameters and models.

In step 1240, thresholding is performed on the frame-level likelihood scores by the threshold scoring unit 910. The threshold scores are input into the score combiner 810 and the utterance scores are input to the score analysis unit 820. From the output of the score analysis unit 820, the password is confirmed or rejected in 1250 and the process goes to step 1260 and ends.

While this invention is being described in conjunction with specific embodiments thereof, it is evident that many alternatives, modifications and variations will be apparent to the those skilled in the art. Accordingly, preferred embodiments of the invention as set forth herein are attended to be illustrative, not limiting. Various changes may be made without departing from the spirit and scope of the invention as described in the following claims.

What is claimed is:

1. A method of identifying a speaker from speakers in a group, comprising:
   receiving a speaker's utterance;
   computing a sequence of a first set of feature vectors based on the received utterance;
   transforming the first set of feature vectors into a second set of feature vectors using transformations specific to a particular segmentation unit;
   computing likelihood scores of the second set of feature vectors using speaker models trained by mixture discriminate analysis using a collection of first sets of feature vectors from all the speakers in the group;
   combining the likelihood scores to determine an utterance score;
   validating the speaker's identity based on the utterance score; and outputting the validation results.

2. The method of claim 1, wherein the second set of feature vectors represents a low-dimensional discriminant subspace.

3. The method of claim 1, wherein the segmentation unit is a phone, a syllable, or an acoustic sub-word unit.

4. The method of claim 1, further comprising a training phase, the training phase comprising:
   extracting the collection of first sets of feature vectors from a password utterance and obtaining phone segments from all speakers in the group;
   developing a mixture model for each phone of a given speaker's password;
   estimating posterior mixture probabilities using the mixture models and the collection of first sets of feature vectors;
   performing a mixture discriminant analysis using the posterior mixture probabilities and the first set of feature vectors; and
   outputting transformation parameters specific to phones and common to all speakers in the group and transformed models for each speaker.

5. The method of claim 1, further comprising an enrollment phase, the enrollment phase comprising:
   receiving the speaker's password utterance multiple times;
   converting the speaker's password utterance into a phone string; and
   storing the phone string in a database containing phone strings of other speakers in the group.

6. The method of claim 5, wherein the speaker's password utterance is known.

7. The method of claim 5, wherein the speaker's password utterance is not known.

8. The method of claim 1, wherein the utterance score is determined by averaging the likelihood scores.

9. The method of claim 1, wherein the utterance score is based on threshold scores generated from the likelihood scores.

10. An apparatus for identifying a speaker from speakers in a group, comprising:
    a speaker independent phone recognizer that receives a speaker's utterance, computes a sequence of a first set of feature vectors based on the received utterance, and transforms the first set of feature vectors into a second set of feature vectors using transformations specific to a particular segmentation unit;
    a likelihood estimator that computes likelihood scores of the second set of feature vectors using speaker models trained by mixture discriminate analysis using a collection of first sets of feature vectors from all the speakers in the group;
    a score combiner that combines the likelihood scores to determine an utterance score; and
    a score analysis unit that validates the speaker's identity based on the utterance score and outputs the validation results.

11. The apparatus of claim 10, wherein the second set of feature vectors represents a low-dimensional discriminant subspace.

12. The apparatus of claim 10, wherein the segmentation unit is a phone, a syllable, or an acoustic sub-word unit.

13. The apparatus of claim 10, further comprising a training phase, wherein the speaker independent phone recognizer extracts the collection of first sets of feature vectors from a password utterance and obtaining phone segments from all speakers in the group, the apparatus further comprising:
    a Gaussian mixture model trainer that develops a mixture model for each phone of a given speaker's password;
    a posterior probability estimator that estimates posterior mixture probabilities using the mixture models and the collection of first sets of feature vectors; and
    a mixture discriminant analysis unit that performs mixture discriminant analysis using the posterior mixture probabilities and the first sets of feature vectors and outputs transformation parameters specific to phones and common to all speakers in the group and outputs transformed models for each speaker.

14. The apparatus of claim 10, further comprising an enrollment phase, wherein tie speaker independent phone recognizer receives the speaker's password utterance multiple times, converts the speaker's password utterance into a phone string, and stores the phone string in a database containing phone strings of other speakers in the group.

15. The apparatus of claim 14, wherein the speaker's password utterance is known.

16. The apparatus of claim 14, wherein the speaker's password utterance is not known.

17. The apparatus of claim 10, wherein the score combiner determines the utterance score by averaging the likelihood scores.

18. The apparatus of claim 10, further comprising a threshold unit, wherein:
    the score combiner determines the utterance score based on threshold scores generated from the likelihood scores by the threshold unit.

* * * * *